United States Patent
Johnson et al.

(10) Patent No.: US 10,185,068 B2
(45) Date of Patent: Jan. 22, 2019

(54) MULTILAYER REFLECTIVE POLARIZER

(71) Applicant: 3M INNOVATIVE PROPERTIES COMPANY, St. Paul, MN (US)

(72) Inventors: Matthew B. Johnson, Woodbury, MN (US); Adam D. Haag, Woodbury, MN (US); Martin E. Denker, Vadnais Heights, MN (US); Takashi Fujita, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/916,913

(22) PCT Filed: Sep. 4, 2014

(86) PCT No.: PCT/US2014/054068
§ 371 (c)(1),
(2) Date: Mar. 4, 2016

(87) PCT Pub. No.: WO2015/035030
PCT Pub. Date: Mar. 12, 2015

(65) Prior Publication Data
US 2016/0195659 A1 Jul. 7, 2016

Related U.S. Application Data

(60) Provisional application No. 61/874,782, filed on Sep. 6, 2013.

(51) Int. Cl.
*G02B 5/30* (2006.01)
*G02F 1/1335* (2006.01)

(52) U.S. Cl.
CPC ......... *G02B 5/3083* (2013.01); *G02B 5/3041* (2013.01); *G02F 1/13362* (2013.01)

(58) Field of Classification Search
CPC .. G02B 5/3083; G02B 5/3041; G02F 1/13362
(Continued)

(56) References Cited

U.S. PATENT DOCUMENTS 3,610,729 A 10/1971 Rogers
4,446,305 A 5/1984 Rogers
(Continued)

FOREIGN PATENT DOCUMENTS

EP 2 618 183 A1 7/2013
JP 2012-103731 A 5/2012
(Continued)

OTHER PUBLICATIONS

Weber, "Giant Birefringent Optics in Multilayer Polymer Mirrors", Science, vol. 287, Mar. 31, 2000, 6 pages.
(Continued)

*Primary Examiner* — William R Alexander
*Assistant Examiner* — Grant Gagnon
(74) *Attorney, Agent, or Firm* — Michael Stern

(57) ABSTRACT

Multilayer reflective polarizers are described. More particularly, multilayer reflective polarizers having a higher block light transmission at longer wavelengths than shorter wavelengths while having a high pass light transmission are described. The described multilayer reflective polarizers may be combined with absorbing polarizers or used in display devices.

21 Claims, 9 Drawing Sheets

(58) Field of Classification Search
USPC .......................................................... 359/489
See application file for complete search history.

(56) References Cited

U.S. PATENT DOCUMENTS

| | | |
|---|---|---|
| 4,540,623 A | 9/1985 | Im |
| 5,103,337 A | 4/1992 | Schrenk |
| 5,233,465 A | 8/1993 | Wheatley et al. |
| 5,296,961 A | 3/1994 | Trost et al. |
| 5,360,659 A | 11/1994 | Arends |
| 5,448,404 A | 9/1995 | Schrenk |
| 5,825,542 A | 10/1998 | Cobb |
| 5,882,774 A | 3/1999 | Jonza |
| 6,088,159 A | 7/2000 | Weber |
| 6,157,490 A | 12/2000 | Wheatley |
| 6,352,761 B1 | 3/2002 | Hebrink |
| 6,368,699 B1 | 4/2002 | Gilbert |
| 6,531,230 B1 | 3/2003 | Weber |
| 6,565,982 B1 | 5/2003 | Ouderkirk |
| 6,783,349 B2 | 8/2004 | Neavin |
| 7,104,776 B2 | 9/2006 | Merrill |
| 2006/0226562 A1 | 10/2006 | Johnson |
| 2007/0047080 A1 | 3/2007 | Stover |
| 2008/0151147 A1 | 6/2008 | Weber |
| 2009/0034073 A1 | 2/2009 | Lazarev et al. |
| 2011/0102891 A1 | 5/2011 | Derks |
| 2011/0272849 A1 | 11/2011 | Neavin |
| 2015/0022888 A1* | 1/2015 | Weber ...................... G02B 5/30 359/487 |
| 2015/0109561 A1* | 4/2015 | Fuchida ................ G02F 1/1335 349/96 |

FOREIGN PATENT DOCUMENTS

| | | |
|---|---|---|
| WO | WO 1995-17303 | 6/1995 |
| WO | 96/13947 A2 | 6/1996 |
| WO | WO 1999-39224 | 1/1998 |
| WO | WO 98/04938 A1 | 2/1998 |

OTHER PUBLICATIONS

International Search Report for PCT International Application No. PCT/ US2014/054068, dated Mar. 12, 2014, 3 pages.

H. A. Macleod, Thin-Film Optical Filters, 2nd Ed., Macmillan Publishing Co. (1986) Table of Contents and chapters 2, 5 & 8.

Alfred Thelen, Design of Optical Interference Coatings, McGraw-Hill, Inc., (1989) Table of Contents and chapters 2, 5, 9 and 12.

* cited by examiner

MULTILAYER REFLECTIVE POLARIZER

CROSS REFERENCE TO RELATED APPLICATIONS

This application is a national stage filing under 35 U.S.C. 371 of PCT/US2014/054068, filed Sep. 4, 2014, which claims the benefit of U.S. Provisional Application No. 61/874,782, filed Sep. 6, 2013, the disclosure of which is incorporated by reference in its/their entirety herein.

BACKGROUND

Reflective polarizers substantially reflect light of one polarization while substantially transmitting light of an orthogonal polarization. Multilayer optical films are formed by coextruding tens to hundreds of molten polymer layers and subsequently orientating or stretching the resulting film.

SUMMARY

In one aspect, the present disclosure relates to reflective polarizers substantially transmitting pass light and substantially reflecting block light. In particular, the present disclosure relates to reflective polarizers where an average transmission of block light at normal incidence between 600 and 750 nm is about 1.5 times or greater an average transmission of block light at normal incidence between 420 and 600 nm, and for a range between 400 and 680 nm, a transmission of pass light as measured at a 60° angle of incidence is not less than 90%. In some embodiments, the reflective polarizer has an average transmission of block light at normal incidence between 600 and 750 nm about 1.8 times or greater an average transmission of block light at normal incidence between 420 and 600 nm.

In another aspect, the present disclosure relates to a reflective polarizer where an average transmission of block light at normal incidence between 600 and 750 nm is about 1.25 or greater an average transmission of block light at normal incidence between 400 and 600 nm. For a range between 400 and 680 nm, a transmission of pass light as measured at 60° incidence is not less than 90%. In some embodiments the average transmission of block light at normal incidence between 600 and 750 nm is about 1.5 times or greater an average transmission of block light at normal incidence between 400 and 600 nm. In some embodiments, a reflective polarizer has, for a range between 400 and 600 nm, an average transmission of block light about 5% or less at normal incidence. In some embodiments, a reflective polarizer has, for a range between 420 and 600 nm, an average transmission of block light about 5% or less at normal incidence.

In yet another aspect, the present disclosure relates to a reflective polarizer where, for a range between 600 and 750 nm, an average transmission of block light is about 5% or greater at normal incidence and for a range between 400 and 680 nm, a transmission of pass light as measured at 60° angle of incidence in not less than 90%. In some embodiments, for a range between 400 and 600 nm, an average transmission of block light is about 5% or less at normal incidence. In some embodiments, for a range between 600 and 680 nm, an average transmission of light is 4% or greater at normal incidence. In some embodiments, for a range between 680 and 730 nm, an average transmission of block light is about 8% or greater at normal incidence.

In another aspect, the present disclosure relates to a reflective polarizer, where, for a range between 400 and 600 nm, an average transmission of block light is about 5% or less at normal incidence, for a range between 600 and 680 nm, an average transmission of block light is about 4% or greater at normal incidence, for a range between 680 and 730, an average transmission of block light is about 8% or greater at normal incidence, and for a range between 730 and 780 nm, an average transmission of block light is about 10% or greater at normal incidence. For a range between 400 and 680 nm, a transmission of pass light as measured at 60° angle of incidence is not less than 90%.

In yet another aspect, the present disclosure relates to a reflective polarizer, where, for a range between 420 and 750 nm, an average transmission of block light is about 4.5% or greater but no greater than 12% at normal incidence. For a range between 400 and 680 nm, a transmission of pass light as measured at 60° angle of incidence is not less than 90%.

In another aspect, the present disclosure relates to a reflective polarizer, where, for a range between 730 and 780 nm, an average transmission of block light at normal incidence is about 10% or greater but no greater than 30%, and for a range between and 680 nm, a transmission of pass light as measured at 60° angle of incidence is not less than 90%. In some embodiments, for a range between 600 and 680 nm, an average transmission of block light at normal incidence is 4% or greater but no greater than 15%. In some embodiments, for a range between 680 and 730 nm, an average transmission of block light at normal incidence is about 8% or greater but no greater than 25%.

In yet another aspect, the present disclosure relates to reflective polarizers where an average transmission of block light at normal incidence between 600 and 750 nm is about 1.5 times or greater an average transmission of block light at normal incidence between 420 and 600 nm, and for a range between 400 and 680 nm, a transmission of pass light as measured at a 60° angle of incidence is greater than or equal to a transmission of pass light as measured at normal incidence.

In some embodiments, the reflective polarizer is thinner than 26 μm. In some embodiments, the reflective polarizer is included in an optical stack. In some embodiments, the optical stack further includes an absorbing polarizer.

DETAILED DESCRIPTION

Figure 1:
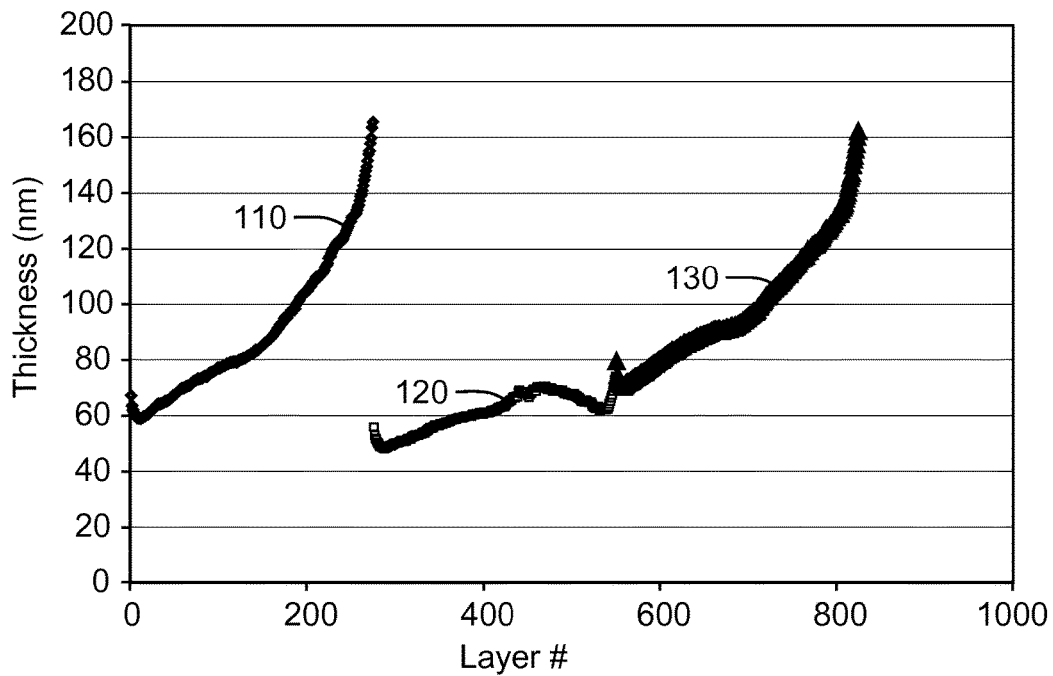
FIG. 1 is a graph depicting the layer profile of Comparative Example C1.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5*\Delta n_x$, or $\Delta n_z \leq 0.25*\Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

One measure of performance of the reflective polarizer in the context of a display system is referred to as "gain". The gain of a reflective polarizer or other optical film is a measure of how much brighter the display appears to the viewer with the optical film compared to the display without the optical film. More specifically, the gain of an optical film is the ratio of the luminance of the display system (or of a portion thereof, such as the backlight) with the optical film to the luminance of the display system without the optical film. Since luminance is in general a function of viewing orientation, gain is also a function of viewing orientation. If gain is referred to without any indication of orientation, on-axis performance is ordinarily presumed. High gains are normally associated with reflective polarizers that have very high reflectivity for the block axis and very high transmissivity (very low reflectivity) for the pass axis, for both normally and obliquely incident light. This is because a very high block axis reflectivity maximizes the chance that a light ray of the non-useable polarization will be reflected back into the backlight so that it can be converted to the useable polarization; and a very low pass axis reflectivity maximizes the chance that a light ray of the useable polarization will pass out of the backlight towards the LC panel, with minimal loss.

Another performance measure of the reflective polarizer in the context of a full RGB color display system is the amount of color the component introduces into the system, both on-axis and off-axis, as a result of spectral non-uniformities in reflectance or transmission.

Contrast ratio—that is, the ratio of transmission for light whose polarization axis is aligned with the pass axis of the reflective polarizer to transmission for light whose polarization axis is aligned with the block axis of the reflective polarizer—is another important metric for quantifying the performance of a reflective polarizer. The contrast ratio may be measured for the reflective polarizer alone or for the reflective polarizer incorporated into a backlight, for example, in combination with a liquid crystal display panel and an absorbing polarizer. Contrast ratio therefore may generally be improved by higher overall pass light transmission or lower overall block light transmission.

In some applications, it is desirable to create a thinner reflective polarizer. Note that "thinner" as used here may also refer to the ability to add additional optically active (e.g., to improve optical performance) or inactive layers (e.g., to improve physical characteristics) yet preserve the same or similar thickness. Because the optical function of the microlayers in the reflective polarizer is linked to the specific optical thickness of each microlayer, it is often not possible to achieve the same optical properties simply by making each microlayer thinner. Another option for reducing thickness is through judicious layer profile control, that is, in some cases, selectively omitting certain microlayers, resulting in a thinner overall reflective polarizer. Previously, it was believed that this approach resulted in a tradeoff between overall polarizer thickness and optical performance; for example, contrast ratio would suffer because the reduced thickness reflective polarizer would not as effectively reflect light across the entire band of a wavelength range of interest. In other words, the transmission of block light (light whose polarization axis is aligned with the block axis of the reflective polarizer) increases as some of the thickest optical layers are removed (corresponding to the longest reflected wavelengths), and it would seem that such an increase in transmitted block light would correspond to a reduced contrast ratio when combined, for example, with an absorbing polarizer. Surprisingly, however, for certain multilayer reflective polarizer layer profiles, despite increased block state transmission for certain wavelengths, the overall contrast ratio when combined with an absorbing polarizer was similar to or better than a thicker multilayer reflective polarizer with less block state transmission for those same wavelengths. Reflective polarizers described herein may be thinner than 50 μm, thinner than 30 μm, thinner than 20 μm, or thinner than 17 μm.

The pass light and block light transmission spectra may be a useful way of characterizing reflective polarizers of the present disclosure. In some embodiments, for example, pass light transmission may be not less than 90% in a range from 400-600 nm or 420-600 nm. Pass light transmission may be measured at 60° incidence. In some embodiments, pass light transmission at 60° incidence may be equal to or greater than pass light transmission at normal incidence in a range from 400-680 nm. Block light spectra may have a 'sloped' type spectra and may be characterized by comparing average transmissions of block light, measured at normal incidence, within different wavelength ranges. For example, an average transmission of block light at normal incidence between 600 and 750 nm may be about 1.5 times greater or 1.8 times greater than an average transmission of block light at normal incidence between 420 and 600 nm. In some embodiments, an average transmission of block light at normal incidence between 600 and 750 nm may be about 1.25 times greater or 1.5 times greater than an average transmission of block light at normal incidence between 400 and 600 nm. In some embodiments, it may be helpful to place one or more bounds on the average transmission of block light at normal incidence for certain wavelength ranges, for example, about 4.5% or greater but no higher than 12% between 420 and 750 nm. In other embodiments, an average transmission of block light at normal incidence may be about 10% or greater but no greater than 30% between 730 and 780 nm.

Reflective polarizers of the present disclosure may be suitable for inclusion in various display devices, in some cases in combination with one or more absorbing polarizers, reflectors, turning films, prism films, substrates, lightguides, liquid crystal displays, or diffusers. The present disclosure also contemplates optical stacks and backlights including the described reflective polarizers.

EXAMPLES

Comparative Example C1

A birefringent reflective polarizer was prepared as follows. Three multilayer optical film packets were co-extruded as described in the Example of U.S. Pat. No. 6,088,159 (Weber et al.). Polymers generally described in U.S. Pat. No. 6,352,761 (Hebrink et al.) were used for the optical layers. The first polymer (first optical layers) was polyethylene naphthalate (PEN) homopolymer (100 mol % naphthalene dicarboxylate with 100 mol % ethylene glycol) having a Tg of 121-123° C. The second polymer (second optical layers) was a first polyethylene naphthalate copolymer (coPEN) having 55 mol % naphthalate and 45 mol % terephthalate as carboxylates and 95.8 mol % ethylene glycol, 4 mol % hexane diol, and 0.2 mol % trimethylol propane as glycols. The second polymer had a Tg of 94° C. The polymer used for the skin layers was a second coPEN having 75 mol % naphthalate and 25 mol % terephthalate as carboxylates and 95.8 mol % ethylene glycol, 4 mol % hexane diol, and 0.2 mol % trimethylol propane as glycols. The second polymer had a Tg of 101° C.

Figure 2:
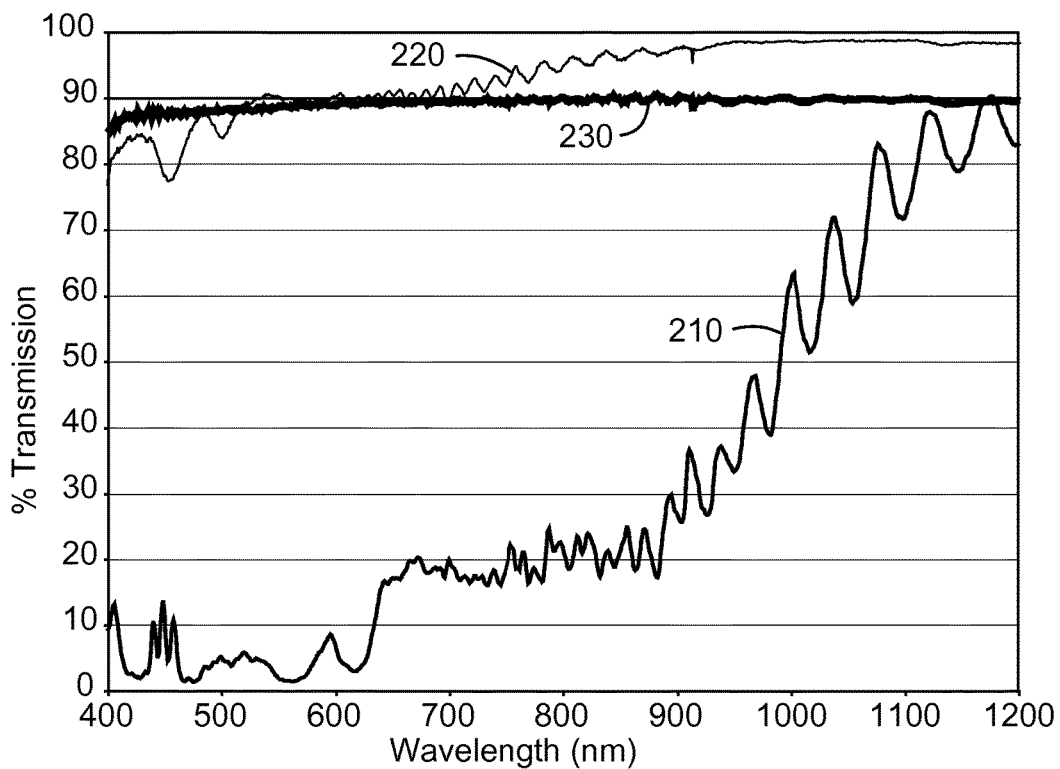
FIG. 2 is a graph depicting the pass and block state spectra of Comparative Example C1.

The reflective polarizer was manufactured using the feedblock method described in U.S. Patent Application Publication No. 2011/0272849 entitled "Feedblock for Manufacturing Multilayer Polymeric Films". The PEN and first coPEN polymers were fed from separate extruders to a multilayer coextrusion feedblock, in which they were assembled into a packet of 275 alternating optical layers, plus thicker protective boundary layers of the coPEN material on each side, for a total of 277 layers. From the feedblock, the multilayer melt was conveyed through one three-fold layer multiplier, resulting in a construction having 829 layers. The skin layers of the second coPEN were added to the construction, resulting in a final construction having 831 layers. The multilayer melt was then cast through a film die onto a chill roll, in the conventional manner for polyester films, upon which it was quenched. The cast web was then stretched in a commercial scale linear tenter at temperatures and draw profiles similar to those described in Example 2A of US Patent Application Publication No. 2007/0047080 (Stover et al.). During the production of the multilayered film a layer profile for each packet was targeted to best balance optical performance and manufacturing efficiency. This layer profile is shown in FIG. 1, including first packet 110, second packet 120, and third packet 130. The resulting pass and block state transmission spectra are shown in FIG. 2, including block light at normal incidence as curve 210, pass light at 60° as curve 220, and pass light at normal incidence as curve 230. The film had a thickness as measured by a capacitance gauge of approximately 92 μm.

Comparative Example C2

A birefringent reflective polarizer was prepared as follows. A single multilayer optical packet was co-extruded as described in US Patent Application Publication No. 2011/0102891, entitled "Low Layer Count Reflective Polarizer with Optimized Gain". Polymers generally described in U.S. Pat. No. 6,352,761 (Hebrink et al.) were used for the optical layers. The first polymer (first optical layers) was polyethylene naphthalate (PEN) homopolymer (100 mol % naphthalene dicarboxylate with 100 mol % ethylene glycol)

having a Tg of 121-123° C. The second polymer (second optical layers) was a blend of a first polyethylene naphthalate copolymer (coPEN) having 90 mol % naphthalate and 10 mol % copolyesters including Polyethylene Terephthalate Glycol (PETG) at a ratio of approximately 45 mol % 90/10 PEN to 55 mol % PETG. The second polymer had a Tg of approximately 97-100° C. The polymer used for the skin layers was the same as that used for the second polymer layers.

Figure 3:
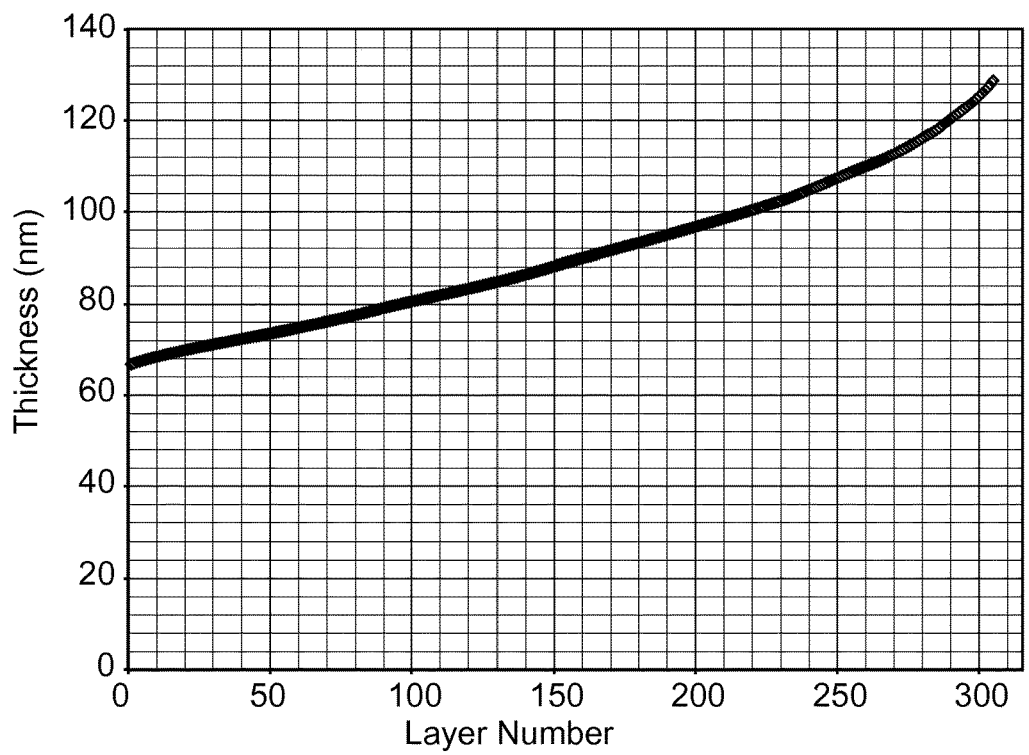
FIG. 3 is a graph depicting the layer profile of Comparative Example C2.
Figure 4:
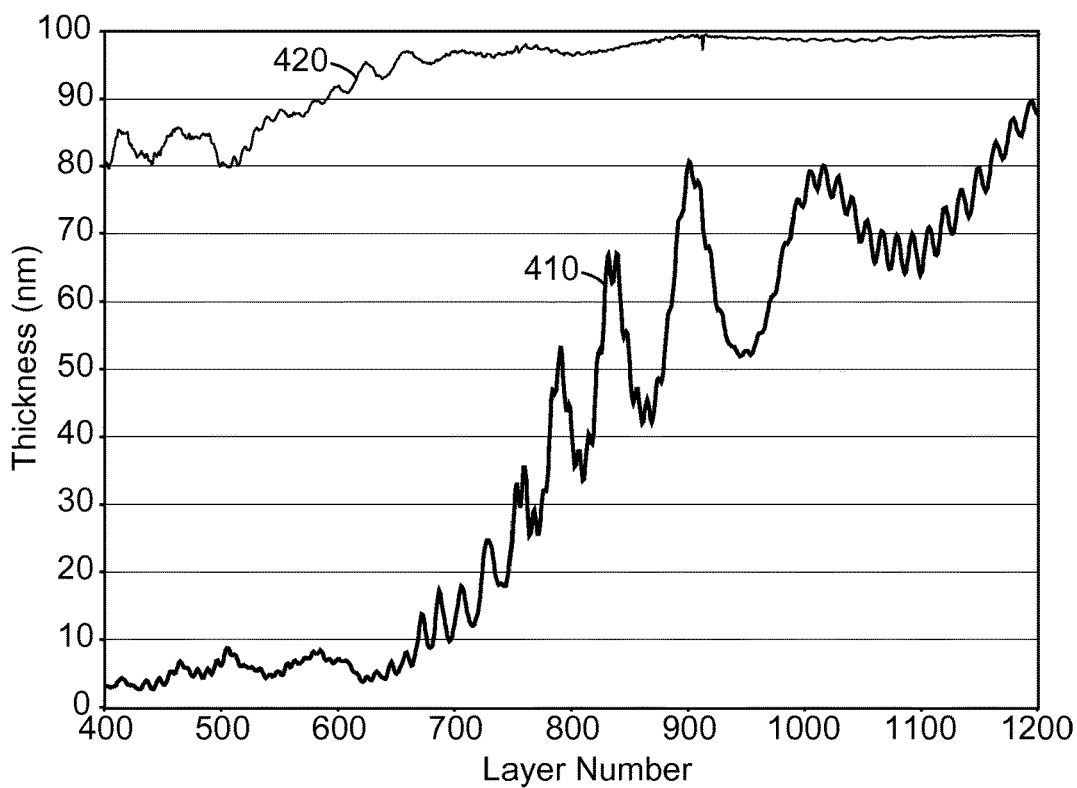
FIG. 4 is a graph depicting the pass and block state spectra of Comparative Example C2.

The reflective polarizer was manufactured using the feedblock method described in U.S. Patent Application Publication No. 2011/0272849 entitled "Feedblock for Manufacturing Multilayer Polymeric Films". The materials were fed from separate extruders to a multilayer coextrusion feedblock, in which they were assembled into a packet of 305 alternating optical layers, plus thicker protective boundary layers formed from the second optical layer material on each side for a total of 307 layers. Skin layers formed from the second optical layer material were added to the construction, resulting in a final construction having 307 layers. The multilayer melt was then cast through a film die onto a chill roll, in the conventional manner for polyester films, upon which it was quenched. The cast web was then stretched in a commercial scale linear tenter at temperatures and draw profile similar to that described in Example 2A of US Patent Application Publication No. 2007/0047080 (Stover et al.). During the production of the multilayered film a layer profile for each packet was targeted to best balance optical performance and manufacturing efficiency. This layer profile is shown in FIG. 3. The resulting pass and block state transmission spectra are shown in FIG. 4, including block light at normal incidence as curve 410 and pass light at 60° as curve 420. The film had a resulting thickness as measured by a capacitance gauge of approximately 35 µm.

Comparative Example C3

A birefringent reflective polarizer was prepared in a manner similar to that of Comparative Example 2 as follows. A single multilayer optical packet was co-extruded. The packet included of 275 alternating layers of 90/10 coPEN, a polymer composed of 90% polyethylene naphthalate (PEN) and 10% polyethylene terephthalate (PET), and a low index isotropic layer, which was made with a blend of polycarbonate and copolyesters (PC:coPET). The low index layer had a refractive index of about 1.57 and remained substantially isotropic upon uniaxial orientation. The PC:coPET molar ratio was approximately 42.5 mol % polycarbonate and 57.5 mol % coPET and the material had a Tg of 105° C. This isotropic material was chosen such that after stretching its refractive indices in the two non-stretch directions remained substantially matched with those of the birefringent material in the non-stretching direction, while in the stretching direction there was a substantial mis-match in refractive indices between birefringent and non-birefringent layers.

The 90/10 PEN and PC:coPET polymers were fed from separate extruders to a multilayer coextrusion feedblock, in which they were assembled into a packet of 275 alternating optical layers, plus thicker protective boundary layers of the PC:coPET polymer on each side, for a total of 277 layers. After the feedblock, skin layers were added where the polymer used for the skin layers was a second PC:coPET having a molar ratio of 50 mol % PC and 50 mol % coPET and having a Tg of 110° C. The multilayer melt was then cast through a film die onto a chill roll, in the conventional manner for polyester films, upon which it was quenched. The cast web was then stretched in a parabolic tenter as described in U.S. Pat. No. 7,104,776 (Merrill et al.) at temperatures and draw ratios (about 6.0) similar to that described in Example 2A of US Patent Application Publication No. 2007/0047080 (Stover et al.).

Figure 5:
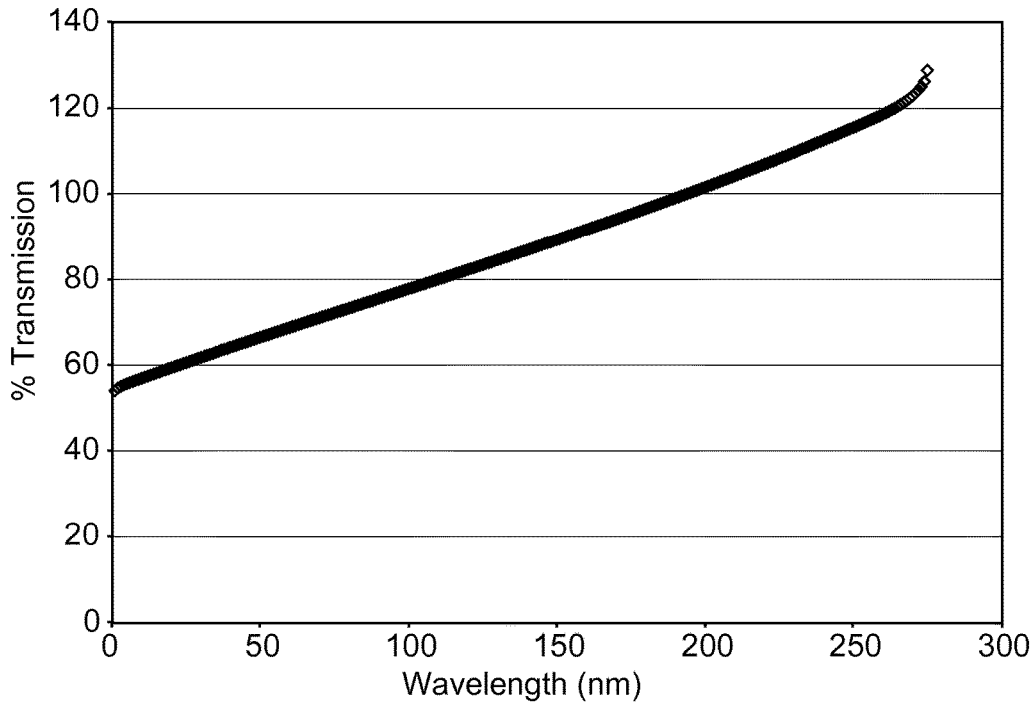
FIG. 5 is a graph depicting the layer profile of Comparative Example C3.
Figure 6:
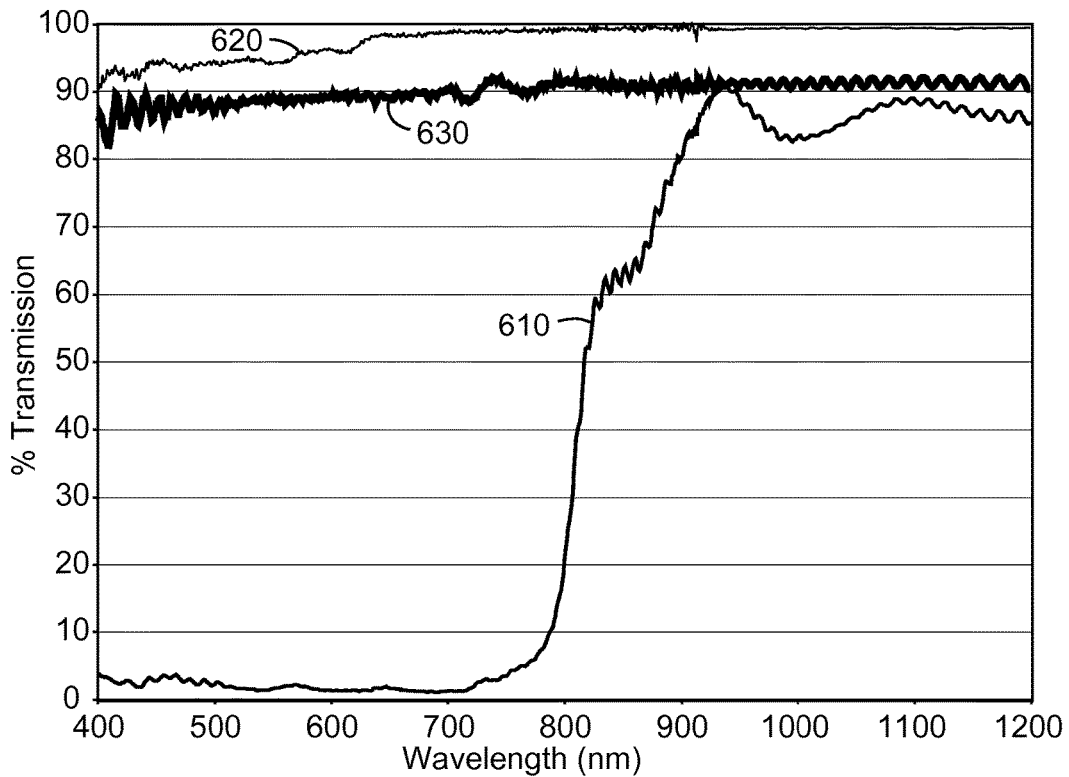
FIG. 6 is a graph depicting the pass and block state spectra of Comparative Example C3.

During the production of the multilayered film a linear layer profile for the single packet was targeted to best balance optical performance and manufacturing efficiency. This layer profile is shown in FIG. 5. The targeted slope was approximately 0.24 nm/layer. The resulting pass and block state transmission spectra are shown in FIG. 6, including block light at normal incidence as curve 610, pass light at 60° as curve 620, and pass light at normal incidence as curve 630. The film had a resulting thickness as measured by a capacitance gauge of approximately 26.5 µm.

Comparative Example C4

A birefringent reflective polarizer was prepared in a manner similar to Comparative Example C3 as follows. A single multilayer optical packet was co-extruded. The packet included 183 alternating layers of 90/10 coPEN, a polymer composed of 90% polyethylene naphthalate (PEN) and 10% polyethylene terephthalate (PET), and a low index isotropic layer. The low index layer was made with a blend of polycarbonate and copolyesters (PC:coPET) such that the refractive index was about 1.57 and the material remained substantially isotropic upon uniaxial orientation. The PC:coPET molar ratio was approximately 42.5 mol % polycarbonate and 57.5 mol % coPET and had a Tg of 105° C. This isotropic material was chosen such that after stretching its refractive indices in the two non-stretch directions remained substantially matched with those of the birefringent material in the non-stretching direction while in the stretching direction there was a substantial mis-match in refractive indices between birefringent and non-birefringent layers. The draw ratio used in the parabolic tenter was about 6.5.

Figure 7:
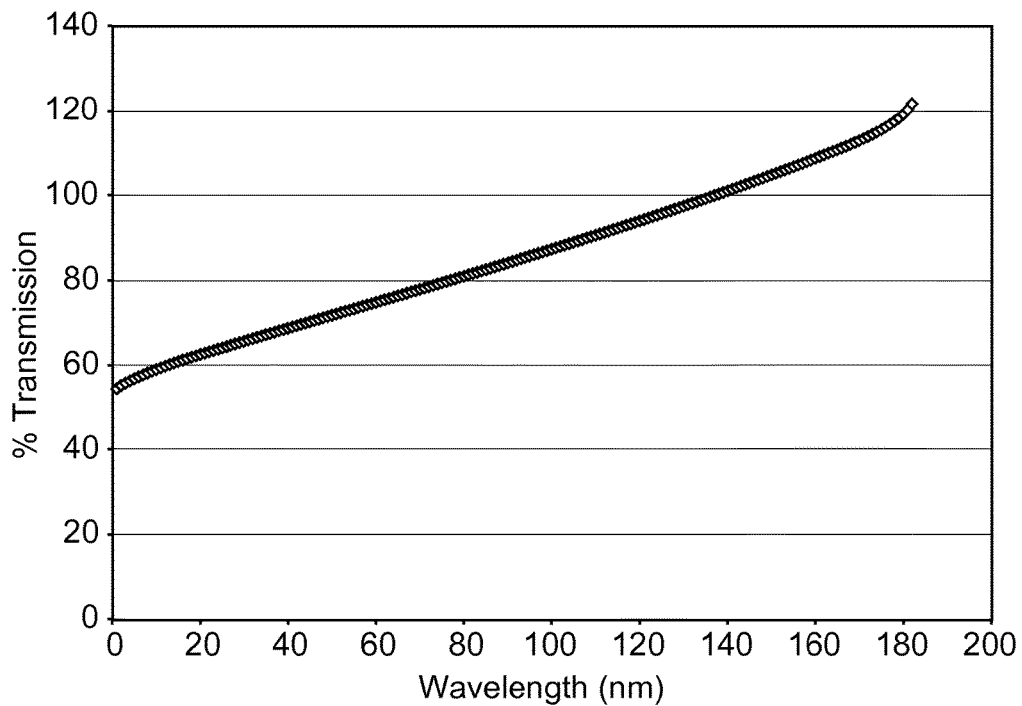
FIG. 7 is a graph depicting the layer profile of Comparative Example C4.
Figure 8:
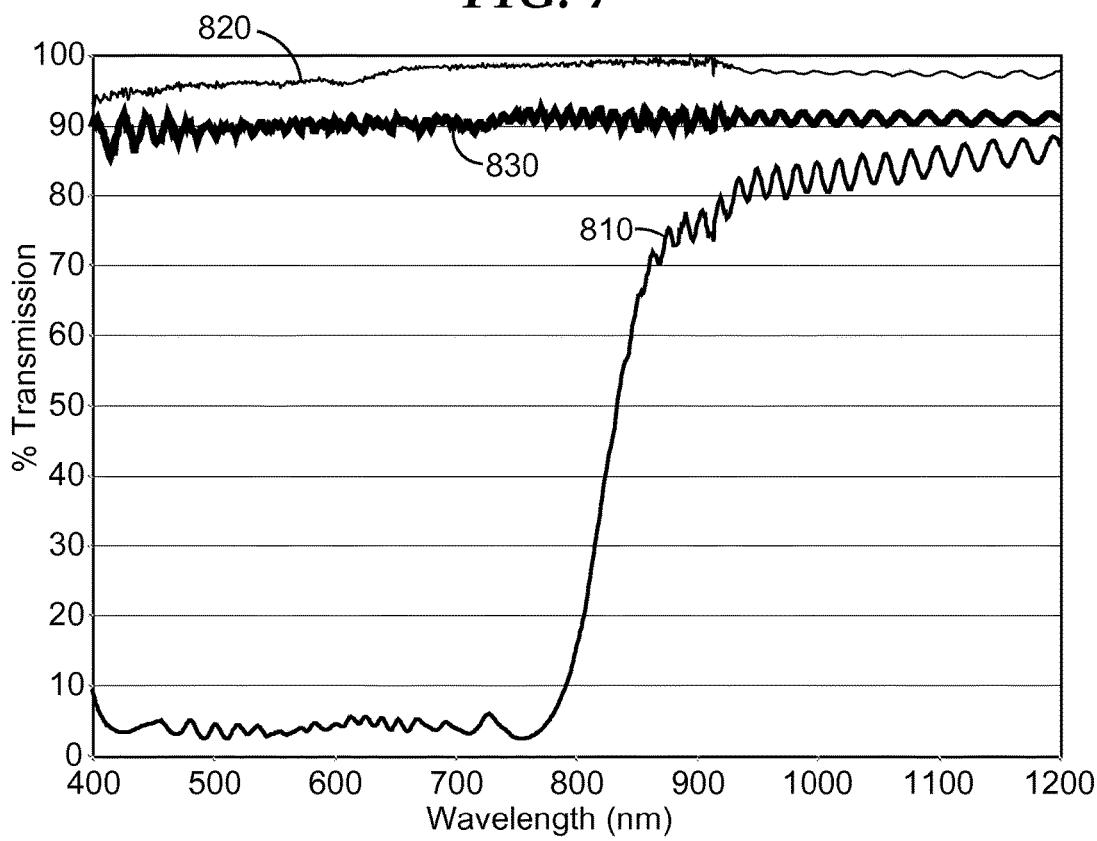
FIG. 8 is a graph depicting the pass and block state spectra of Comparative Example C4.

The 90/10 PEN and PC:coPET polymers were fed from separate extruders to a multilayer coextrusion feedblock, in which they were assembled into a packet of 183 alternating optical layers, plus thicker protective boundary layers of the PC:coPET material on each side, for a total of 185 layers. During the production of the multilayered film a linear layer profile for the single packet was targeted to best balance optical performance and manufacturing efficiency. This layer profile is shown in FIG. 7. The targeted slope was approximately 0.34 nm/layer. The resulting pass and block state transmission spectra are shown below in FIG. 8, including block light at normal incidence as curve 810, pass light at 60° as curve 820, and pass light at normal incidence as curve 830. The film had a resulting physical thickness as measured by a capacitance gauge of approximately 16.5 µm.

Comparative Example C5

Figure 9:
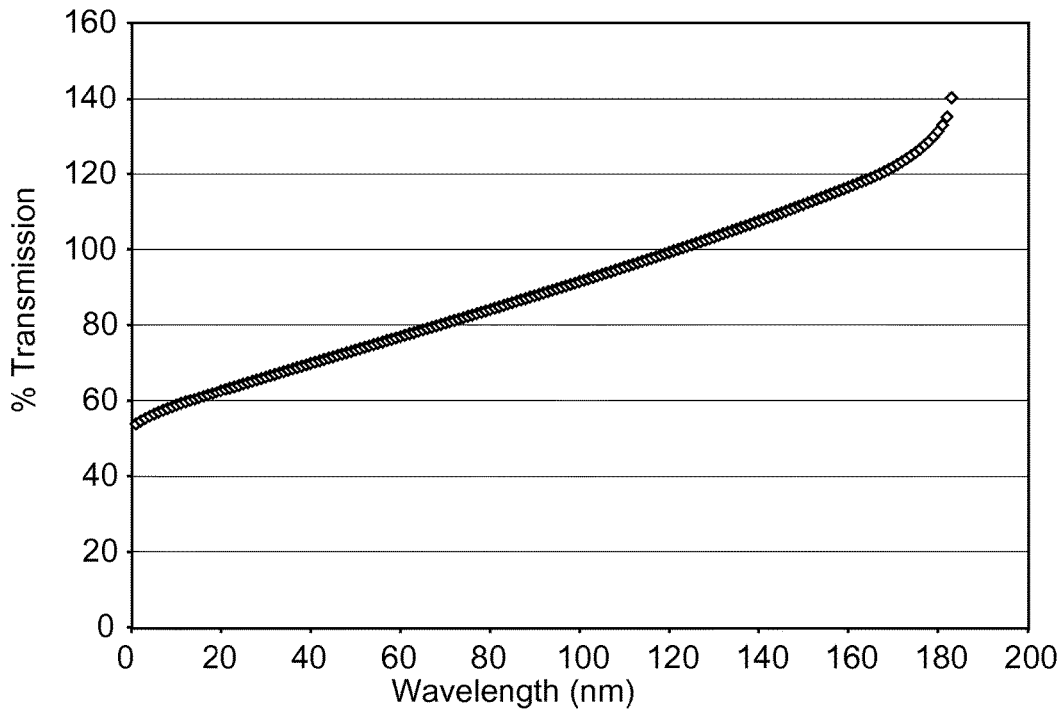
FIG. 9 is a graph depicting the layer profile of Comparative Example C5.
Figure 10:
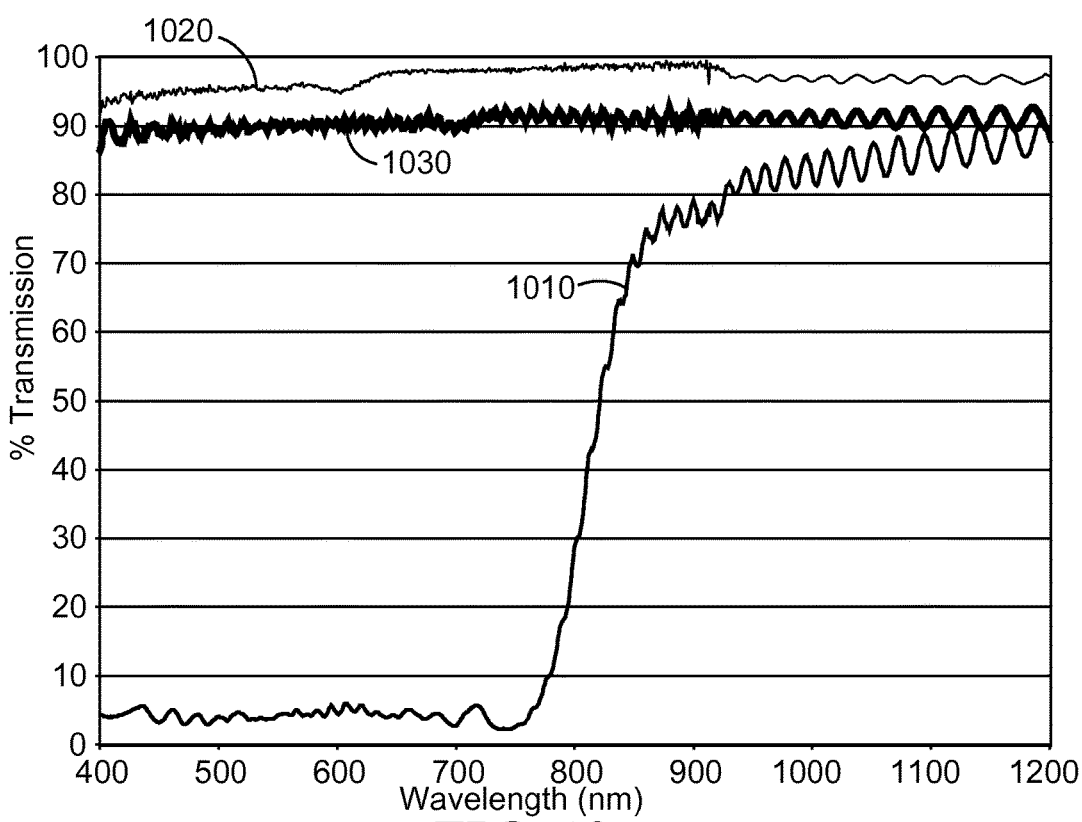
FIG. 10 is a graph depicting the pass and block state spectra of Comparative Example C5.

A birefringent reflective polarizer was prepared as in Comparative Example C4, except that the layer thickness profile was chosen as shown in FIG. 9. The profile was approximately linear with a targeted slope of approximately 0.40 nm/layer. The resulting pass and block state transmission spectra are shown in FIG. 10, including block light at normal incidence as curve 1010, pass light at 60° as curve 1020, and pass light at normal incidence as curve 1030. The film had a resulting physical thickness as measured by a capacitance gauge of approximately 16.3 µm. The thickness reduction was due to the broadening of the block state spectra thus placing more layers on average at lower wavelengths.

Example 1

Figure 11:
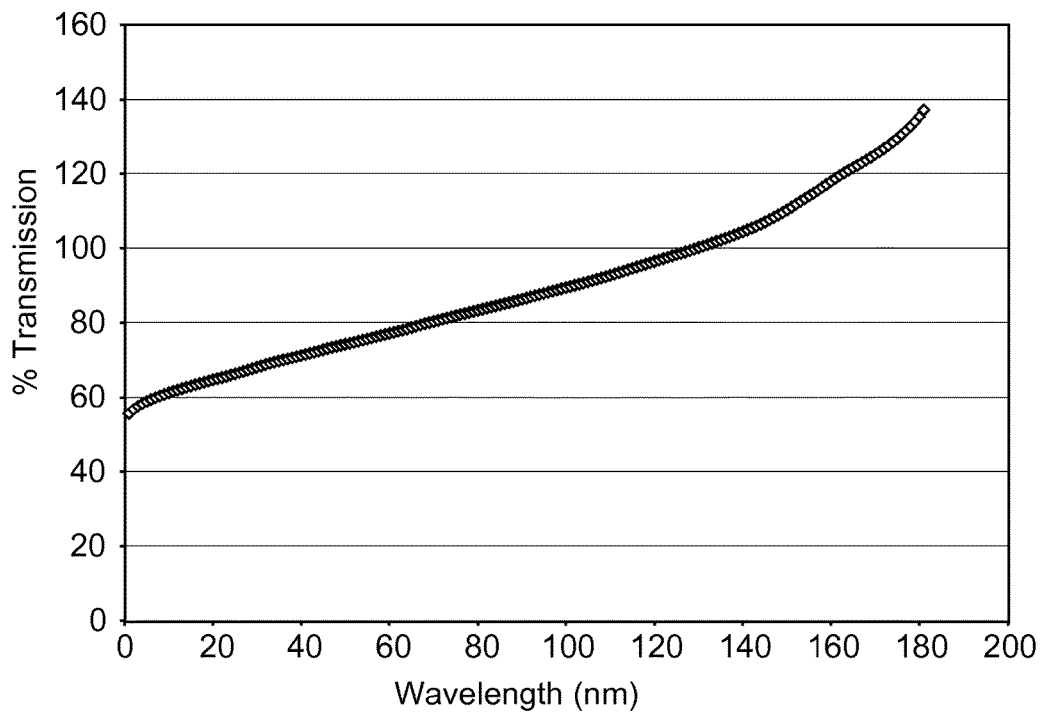
FIG. 11 is a graph depicting the layer profile of Example 1.
Figure 12:
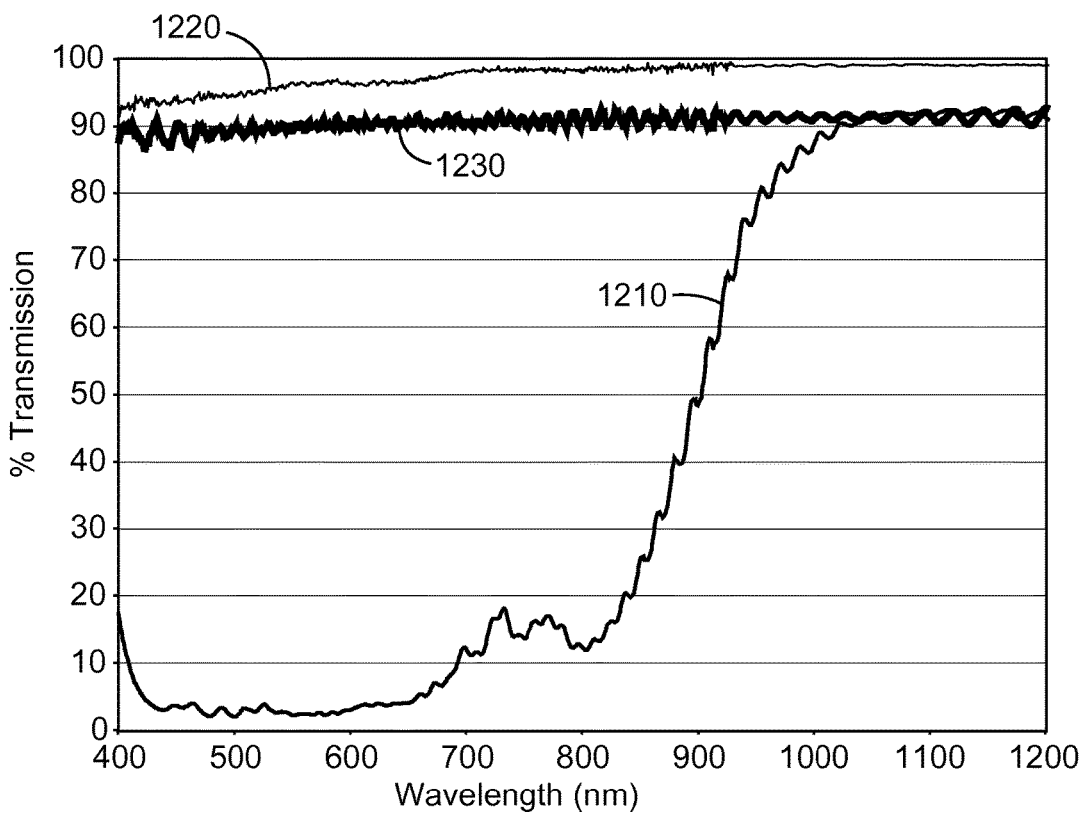
FIG. 12 is a graph depicting the pass and block state spectra of Example 1.

A reflective polarizer including 183 alternating optical layers was produced in a manner similar to that described in Comparative Example C4 except that the layer profile was modified as shown in FIG. 11. As shown in FIG. 12, which includes block light at normal incidence as curve 1210, pass light at 60° as curve 1220, and pass light at normal incidence as curve 1230, this resulted in a sloped block state spectra and in pass state spectra that remained substantially flat for both 0 degree and 60 degree incident angles. The targeted slope for layers 1 through 150 was approximately 0.33 nm/layer and for layers 151 through 183, the targeted slope was approximately 0.80 nm/layer. Note that the slope targeted for layers 1 through 150 was approximately the same as that for Comparative Example C4, while the slope for layers 151 through 183 was more than twice this amount. The film had a resulting thickness as measured by a capacitance gauge of approximately 16.3 µm.

Example 2

Figure 13:
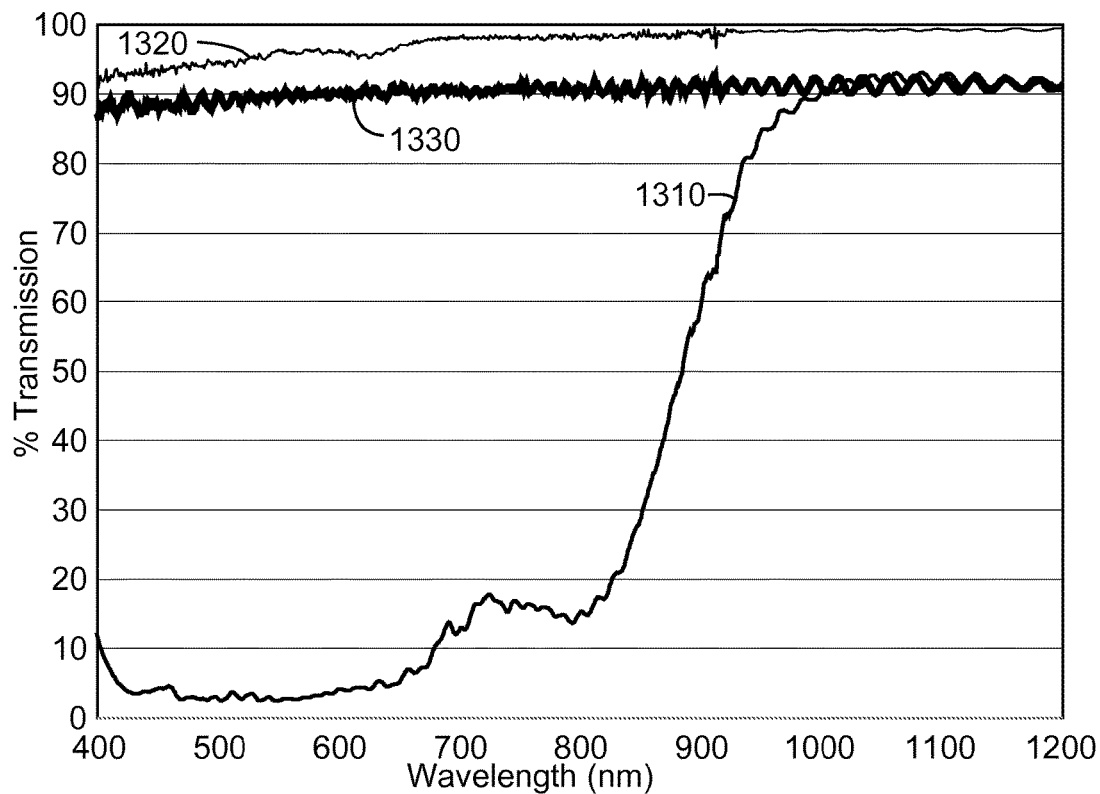
FIG. 13 is a graph depicting the pass and block state spectra of Example 2.

A reflective polarizer having 183 optical layers was produced in a similar manner to that described in Example 1 except that the draw ratio was lowered from about 6.5 to about 6.0-6.2 in order to create less block state transmission while maintaining a similar sloped block state spectra. The pass and block state spectra are shown in FIG. 13, including block light at normal incidence as curve 1310, pass light at 60° as curve 1320, and pass light at normal incidence as curve 1330. The film had a resulting physical thickness as measured by a capacitance gauge of approximately 16.3 µm.

Example 3

Figure 14:
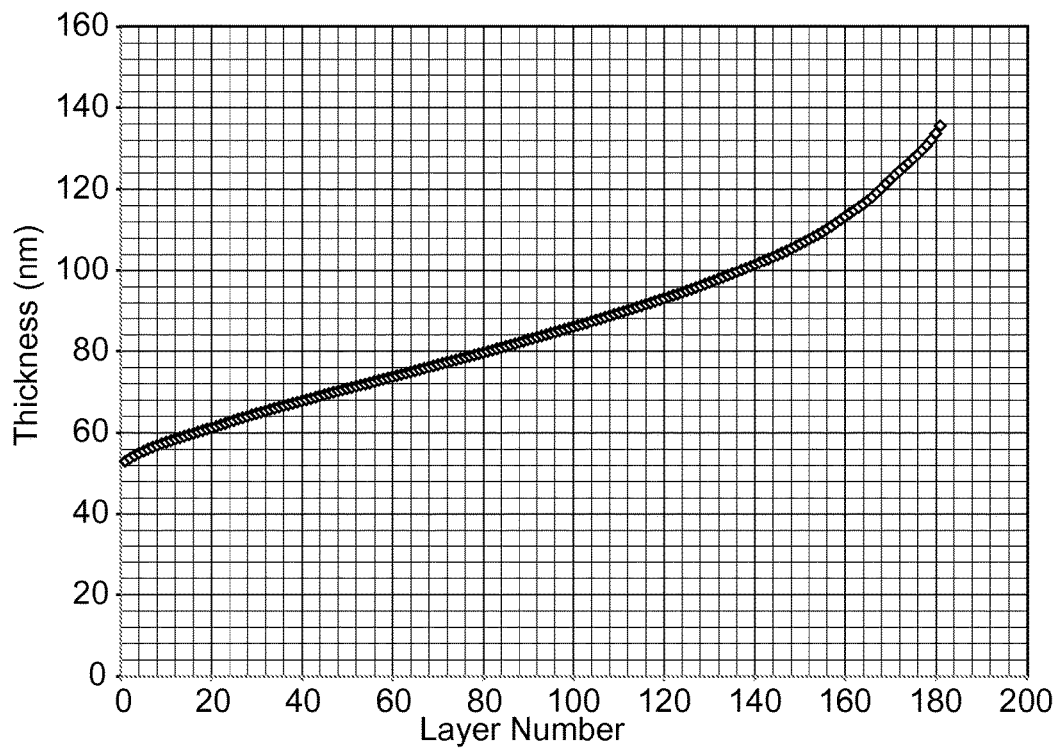
FIG. 14 is a graph depicting the layer profile of Example 3.
Figure 15:
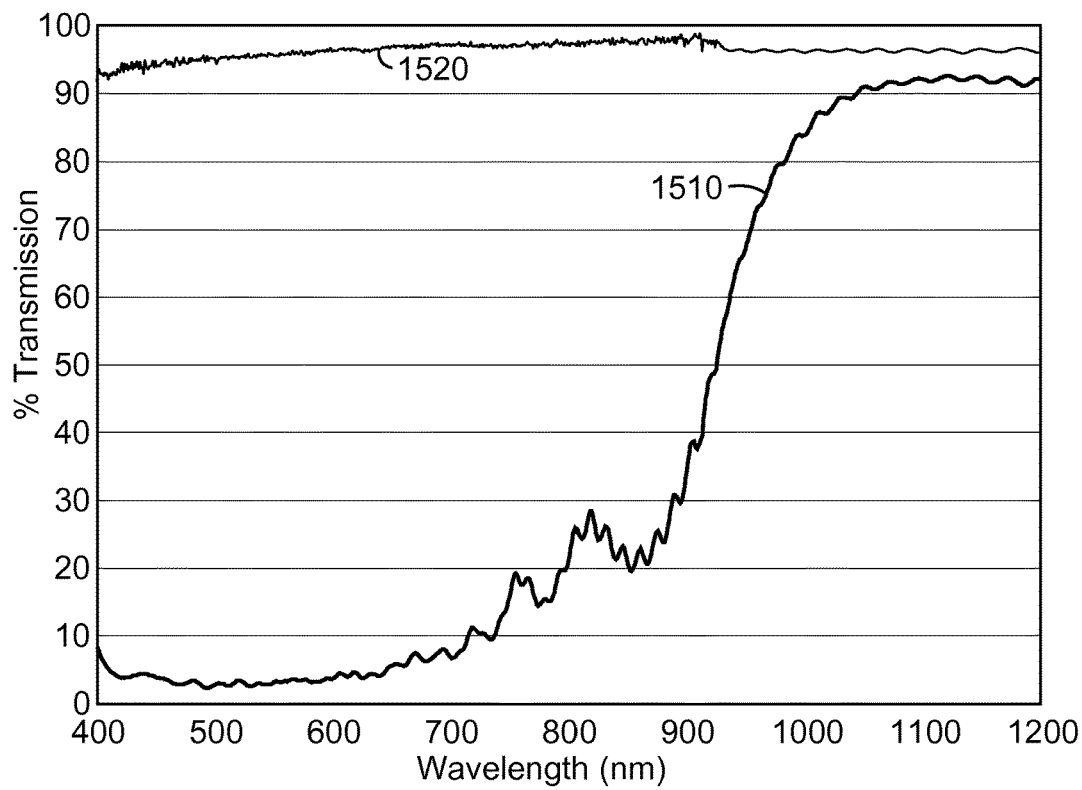
FIG. 15 is a graph depicting the pass and block state spectra of Example 3.

A reflective polarizer having 183 optical layers was produced in a similar manner to that described in Example 1 except that the layer profile was modified as shown in FIG. 14. The spectra are shown in FIG. 15, including block light at normal incidence as curve 1510 and pass light at 60° as curve 1520, where it can be seen that the pass state remained substantially flat for 60 degree spectra while the block state spectra at normal incidence was sloped. The slope targeted for layers 1 thru 150 was about 0.33 nm/layer while for layers 151-183 the targeted slope was about 0.90 nm/layer. The film had a resulting thickness as measured by a capacitance gauge of approximately 16.3 µm.

Example 4

Figure 16:
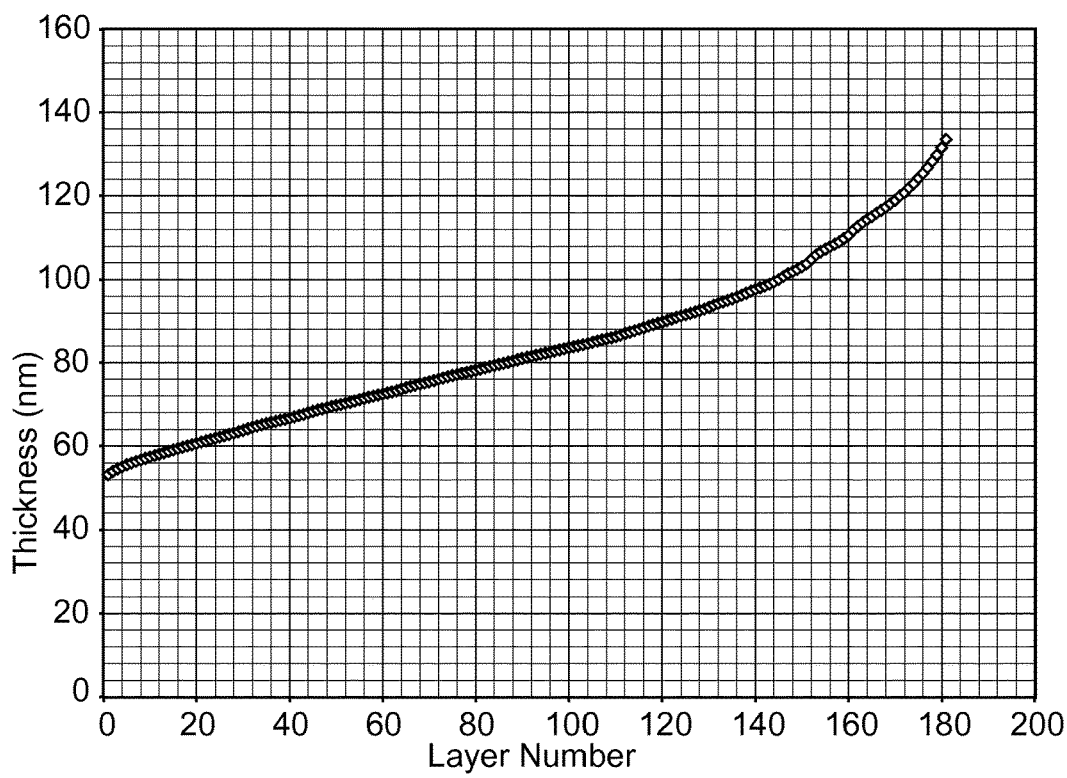
FIG. 16 is a graph depicting the layer profile of Example 4.
Figure 17:
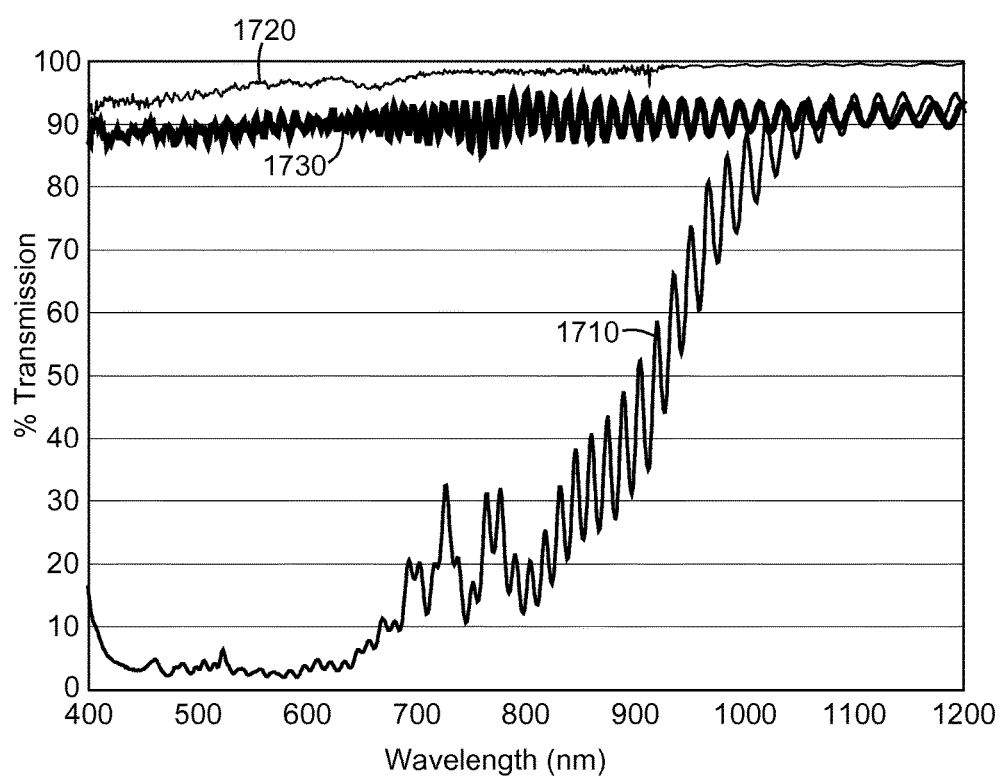
FIG. 17 is a graph depicting the pass and block state spectra of Example 4.

A reflective polarizer having 183 optical layers was produced in a similar manner to that described in Example 1 except that the layer profile was modified as shown in FIG. 16. The spectra are shown in FIG. 17 including block light at normal incidence as curve 1710, pass light at 60° as curve 1720, and pass light at normal incidence as curve 1730, where it can be seen that the pass state spectra remained substantially flat for both 0 degree and 60 degrees while the block state spectra was sloped. The slope targeted for layers 1 through 150 was about 0.30 nm/layer, while the targeted slope for layers 151-183 was about 0.90 nm/layer. The film had a resulting thickness as measured by a capacitance gauge of approximately 16.3 µm.

Table 1 shows the average cross-web percent transmission values for the various Examples for the block state at 0 degrees. Table 2 shows the average pass state transmission values at 0 degrees and the difference in transmission values between two selected wavelength ranges. Table 3 shows the average pass state transmission values at 60 degrees and the difference in transmission values between two selected wavelength ranges. Comparative Examples C1 and C2, which possess a 'sloping' type spectra, have a more dramatic change in pass state transmission as a function of angle than do Comparative Examples C3 through C5 and Examples 1-4.

The data show that by adjusting the layer profile to target a sloped spectra improved block state transmission can be achieved while maintaining a high and 'flat' pass state transmission. When combined with an absorbing polarizer, this can allow the absorbing polarizer to reduce contrast ratio and yet improve brightness. Alternatively, contrast ratio can be increased while maintaining system brightness in display devices as implied by the data in Tables 2 and 3.

TABLE 1

| | Block State Percent Transmission at 0 degree (%) | | | | | | | | |
|---|---|---|---|---|---|---|---|---|---|
| Wavelength Range (nm) | 400-600 | 420-600 | 420-750 | 600-680 | 600-750 | 600-780 | 650-780 | 680-730 | 730-780 |
| Comp. Example C1 | 4.73 | 4.41 | 9.13 | 12.20 | 14.78 | 15.51 | 18.32 | 17.93 | 18.41 |
| Comp. Example C2 | 5.42 | 5.63 | 8.17 | 6.52 | 11.20 | 14.35 | 17.80 | 14.94 | 26.27 |
| Comp. Example C3 | 2.34 | 2.25 | 2.02 | 1.50 | 1.74 | 2.33 | 2.63 | 1.55 | 4.41 |
| Comp. Example C4 | 3.93 | 3.78 | 4.07 | 4.67 | 4.43 | 4.27 | 4.08 | 4.27 | 3.65 |
| Comp. Example C5 | 4.25 | 4.26 | 4.23 | 4.65 | 4.19 | 4.44 | 4.30 | 4.19 | 4.33 |
| Example 1 | 2.96 | 2.96 | 5.66 | 4.61 | 8.38 | 9.61 | 11.83 | 14.33 | 15.61 |
| Example 2 | 3.62 | 3.19 | 6.22 | 5.49 | 9.84 | 10.82 | 13.25 | 14.24 | 15.97 |
| Example 3 | 3.47 | 3.26 | 4.99 | 5.02 | 7.05 | 8.70 | 10.40 | 8.39 | 14.83 |
| Example 4 | 3.84 | 3.30 | 7.03 | 5.81 | 11.48 | 13.45 | 17.03 | 18.40 | 20.83 |

TABLE 2

| | Pass State Transmission at 0 degree (%) | | | | Difference in Pass State Transmission Ranges (%) | |
|---|---|---|---|---|---|---|
| Wavelength Range (nm) | [400-500] | [500-600] | [600-700] | [700-800] | Δ [700-800] −[400-500] | Δ [600-700] −[400-500] |
| Comp. Ex. C1 | 88.40 | 89.19 | 89.53 | 89.78 | 1.38 | 1.13 |
| Comp. Ex. C2 | 88.03 | 88.61 | 90.88 | 90.80 | 2.77 | 2.85 |

TABLE 2-continued

|  | Pass State Transmission at 0 degree (%) | | | | Difference in Pass State Transmission Ranges (%) | |
| --- | --- | --- | --- | --- | --- | --- |
| Wavelength Range (nm) | [400-500] | [500-600] | [600-700] | [700-800] | Δ [700-800] −[400-500] | Δ [600-700] −[400-500] |
| Comp. Ex. C3 | 88.41 | 89.24 | 90.13 | 91.04 | 2.62 | 1.72 |
| Comp. Ex. C4 | 89.71 | 90.20 | 90.72 | 91.06 | 1.35 | 1.01 |
| Comp. Ex. C5 | 89.79 | 90.31 | 90.96 | 91.06 | 1.27 | 1.18 |
| Example 1 | 89.52 | 90.35 | 90.66 | 90.99 | 1.47 | 1.13 |
| Example 2 | 89.33 | 90.17 | 90.63 | 90.68 | 1.35 | 1.30 |
| Example 3 | 89.92 | 90.44 | 90.84 | 90.86 | 0.93 | 0.92 |
| Example 4 | 89.06 | 90.19 | 90.22 | 91.06 | 2.00 | 1.15 |

TABLE 3

|  | Pass State Transmission at 60 degree (%) | | | | Difference in Pass State Transmission (%) | |
| --- | --- | --- | --- | --- | --- | --- |
| Wavelength Range (nm) | [400-500] | [500-600] | [600-700] | [700-800] | Δ [700-800] −[400-500] | Δ [600-700] −[400-500] |
| Comp. Ex. C1 | 83.05 | 89.20 | 90.41 | 93.01 | 9.96 | 7.36 |
| Comp. Ex. C2 | 83.18 | 86.27 | 94.68 | 96.95 | 13.76 | 11.50 |
| Comp. Ex. C3 | 93.31 | 94.84 | 97.74 | 98.97 | 5.66 | 4.43 |
| Comp. Ex. C4 | 95.01 | 96.14 | 97.51 | 98.58 | 3.57 | 2.50 |
| Comp. Ex. C5 | 94.56 | 95.56 | 97.22 | 98.20 | 3.64 | 2.66 |
| Example 1 | 93.80 | 95.84 | 96.86 | 98.34 | 4.55 | 3.07 |
| Example 2 | 93.35 | 95.51 | 96.74 | 98.11 | 4.75 | 3.39 |
| Example 3 | 94.20 | 95.74 | 96.79 | 97.17 | 2.97 | 2.59 |
| Example 4 | 93.78 | 96.00 | 96.75 | 98.33 | 4.55 | 2.97 |

A commercially available tablet computer having an LCD panel was obtained. The film behind the LCD panel in the tablet contained an absorbing polarizer with a reflective polarizer attached with an adhesive. The reflective polarizer in the tablet was very similar to the reflective polarizer of Comparative Example 3. The reflective polarizer attached to the absorbing polarizer was removed and the various Comparative Example films and Example films were attached with an optically clear adhesive. The display was then re-assembled with the same back-light assembly that was received with the device. The luminance of the display was measured as a function of polar angle using a EZ contrast XL 88W conoscope (Model XL88W-R-111124, available from Eldim-Optics, Herouville, Saint-Clair France). The luminance data is reported in Table 4 and the in-display contrast data is shown in Table 5. For both Tables and corresponding data, the % difference relative to the 'As-Received' display, which is equivalent to Comparative Example 3, was calculated.

TABLE 4

|  | Axial Luminance (nits) | Avg % Diff in Axial Luminance | Max. Luminance (nits) | Avg % Diff in Max. Luminance | Integrated Intensity (nits) | Avg % Diff in Int. Inten. |
| --- | --- | --- | --- | --- | --- | --- |
| Comparative Example C1 | 392.9 | 97.7% | 396.7 | 98.3% | 442.0 | 98.0% |
| Comparative Example C2 | 391.5 | 97.3% | 392.5 | 97.3% | 439.3 | 97.4% |
| Comparative Example C3 | 402.3 | 100.0% | 403.5 | 100.0% | 450.8 | 100.0% |
| Comparative Example C4 | 403.6 | 100.3% | 402.1 | 99.6% | 450.4 | 99.9% |
| Comparative Example C5 | 400.2 | 99.5% | 402.1 | 99.6% | 450.4 | 99.9% |
| Example 1 | 402.4 | 100.0% | 406.3 | 100.7% | 452.0 | 100.3% |
| Example 2 | 400.6 | 99.6% | 403.8 | 100.1% | 450.1 | 99.8% |
| Example 3 | 405.2 | 100.7% | 406.0 | 100.6% | 451.4 | 100.1% |
| Example 4 | 399.8 | 99.4% | 402.4 | 99.7% | 449.8 | 99.8% |

TABLE 5

|  | Axial Luminance CR | Avg % Diff in Axial Lum. CR | Max. Luminance CR | Avg % Diff in Max. Lum. CR | Integrated Intensity CR | Avg % Diff in Int. Inten. CR |
|---|---|---|---|---|---|---|
| Comparative Example C1 | 884.6 | 100.2% | 895.6 | 100.7% | 1162 | 101.6% |
| Comparative Example C2 | 892.5 | 101.1% | 901.5 | 101.4% | 1165 | 101.9% |
| Comparative Example C3 | 883 | 100.0% | 889.1 | 100.0% | 1144 | 100.0% |
| Comparative Example C4 | 880.5 | 99.7% | 902.5 | 101.5% | 1141 | 99.8% |
| Comparative Example C5 | 880.2 | 99.7% | 888.8 | 100.0% | 1140 | 99.6% |
| Example 1 | 896 | 101.5% | 918.5 | 103.3% | 1162 | 101.6% |
| Example 2 | 895.2 | 101.4% | 903.6 | 101.6% | 1162 | 101.6% |
| Example 3 | 901.3 | 102.1% | 906.4 | 101.9% | 1162 | 101.5% |
| Example 4 | 896.1 | 101.5% | 903.9 | 101.7% | 1167 | 102.0% |

The following are exemplary embodiments according to the present disclosure:

Item 1. A reflective polarizer substantially transmitting pass light and substantially reflecting block light, wherein
an average transmission of block light at normal incidence between 600 and 750 nm is about 1.5 times or greater an average transmission of block light at normal incidence between 420 and 600 nm; and
for a range between 400 and 680 nm, a transmission of pass light as measured at 60° angle of incidence is not less than 90%.

Item 2. The reflective polarizer of item 1, wherein an average transmission of block light at normal incidence between 600 and 750 nm is about 1.8 times or greater an average transmission of block light at normal incidence between 420 and 600 nm.

Item 3. A reflective polarizer substantially transmitting pass light and substantially reflecting block light, wherein
an average transmission of block light at normal incidence between 600 and 750 nm is about 1.25 times or greater an average transmission of block light at normal incidence between 400 and 600 nm; and
for a range between 400 and 680 nm, a transmission of pass light as measured at 60° angle of incidence is not less than 90%.

Item 4. The reflective polarizer of item 3, wherein the average transmission of block light at normal incidence between 600 and 750 nm is about 1.5 times or greater an average transmission of block light at normal incidence between 400 and 600 nm.

Item 5. The reflective polarizer of any of items 1-4, wherein for a range between 400 and 600 nm, an average transmission of block light is about 5% or less at normal incidence.

Item 6. The reflective polarizer for any of items 1-4, wherein for a range between 420 and 600 nm, an average transmission of block light is about 5% or less at normal incidence Item 7. A reflective polarizer substantially transmitting pass light and substantially reflecting block light, wherein
for a range between 600 and 750 nm, an average transmission of block light is about 5% or greater at normal incidence; and
for a range between 400 and 680 nm, a transmission of pass light as measured at 60° angle of incidence is not less than 90%.

Item 8. The reflective polarizer of item 7, wherein for a range between 400 and 600 nm, an average transmission of block light is about 5% or less at normal incidence.

Item 9. The reflective polarizer of item 7 or 8, wherein for a range between 600 and 680 nm, an average transmission of block light is 4% or greater at normal incidence.

Item 10. The reflective polarizer of any of item 7-9, wherein for a range between 680 and 730 nm, an average transmission of block light is about 8% or greater at normal incidence.

Item 11. A reflective polarizer substantially transmitting pass light and substantially reflecting block light, wherein
for a range between 400 and 600 nm, an average transmission of block light is about 5% or less at normal incidence;
for a range between 600 and 680 nm, an average transmission of block light is 4% or greater at normal incidence;
for a range between 680 and 730 nm, an average transmission of block light is about 8% or greater at normal incidence;
for a range between 730 and 780 nm, an average transmission of block light is about 10% or greater at normal incidence; and
for a range between 400 and 680 nm, a transmission of pass light as measured at 60° angle of incidence is not less than 90%.

Item 12. A reflective polarizer substantially transmitting pass light and substantially reflecting block light, wherein
an average transmission of block light at normal incidence between 420 and 750 nm is about 4.5 percent or greater but no higher than 12%; and
for a range between 400 and 680 nm, a transmission of pass light as measured at 60° angle of incidence is not less than 90%.

Item 13. A reflective polarizer substantially transmitting pass light and substantially reflecting block light, wherein
for a range between 730 and 780 nm, an average transmission of block light at normal incidence is about 10% or greater but no greater than 30%; and
for a range between 400 and 680 nm, a transmission of pass light as measured at 60° angle of incidence is not less than 90%.

Item 14. The reflective polarizer of item 13, wherein for a range between 600 and 680 nm, an average transmission of block light at normal incidence is 4% or greater but no greater than 15%.

Item 15. The reflective polarizer of either item 13 or 14, wherein for a range between 680 and 730 nm, an average transmission of block light at normal incidence is about 8% or greater but no greater than 25%.

Item 16. A reflective polarizer substantially transmitting pass light and substantially reflecting block light, wherein
an average transmission of block light at normal incidence between 600 and 750 nm is about 1.5 times or greater an average transmission of block light at normal incidence between 420 and 600 nm; and
for a range between 400 and 680 nm, a transmission of pass light as measured at 60° angle of incidence is greater than or equal to a transmission of pass light as measured at normal incidence.

Item 17. The reflective polarizer as in any of the previous items, wherein the reflective polarizer is thinner than 26 μm.

Item 18. An optical stack comprising the reflective polarizer of any of the previous items.

Item 19. The optical stack of item 18, further comprising an absorbing polarizer.

Item 20. The optical stack of either item 18 or 19, further comprising an LCD panel.

Item 21. A backlight comprising the optical stack of any of items 18-20.

All U.S. patents and patent applications cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A reflective polarizer substantially transmitting pass light and substantially reflecting block light, wherein
an average transmission of block light at normal incidence between 600 and 750 nm is about 1.5 times or greater an average transmission of block light at normal incidence between 420 and 600 nm; and
throughout all of a range between 400 and 680 nm, a transmission of pass light as measured at 60° angle of incidence is not less than 90%.

2. The reflective polarizer of claim 1, wherein an average transmission of block light at normal incidence between 600 and 750 nm is about 1.8 times or greater an average transmission of block light at normal incidence between 420 and 600 nm.

3. The reflective polarizer as in claim 1, wherein the reflective polarizer is thinner than 26 μm.

4. An optical stack comprising the reflective polarizer of claim 1.

5. A backlight comprising the optical stack of claim 4.

6. The optical stack of claim 4, further comprising an absorbing polarizer.

7. The optical stack of claim 6, further comprising an LCD panel.

8. A reflective polarizer substantially transmitting pass light and substantially reflecting block light, wherein
an average transmission of block light at normal incidence between 600 and 750 nm is about 1.25 times or greater an average transmission of block light at normal incidence between 400 and 600 nm; and
throughout all of a range between 400 and 680 nm, a transmission of pass light as measured at 60° angle of incidence is not less than 90%.

9. The reflective polarizer of claim 8, wherein the average transmission of block light at normal incidence between 600 and 750 nm is about 1.5 times or greater an average transmission of block light at normal incidence between 400 and 600 nm.

10. The reflective polarizer of claim 8, wherein for a range between 400 and 600 nm, an average transmission of block light is about 5% or less at normal incidence.

11. The reflective polarizer of claim 8, wherein for a range between 420 and 600 nm, an average transmission of block light is about 5% or less at normal incidence.

12. A reflective polarizer substantially transmitting pass light and substantially reflecting block light, wherein
for a range between 600 and 750 nm, an average transmission of block light is about 5% or greater at normal incidence; and
throughout all of a range between 400 and 680 nm, a transmission of pass light as measured at 60° angle of incidence is not less than 90%.

13. The reflective polarizer of claim 12, wherein for a range between 400 and 600 nm, an average transmission of block light is about 5% or less at normal incidence.

14. The reflective polarizer of claim 12, wherein for a range between 600 and 680 nm, an average transmission of block light is 4% or greater at normal incidence.

15. The reflective polarizer of claim 12, wherein for a range between 680 and 730 nm, an average transmission of block light is about 8% or greater at normal incidence.

16. A reflective polarizer substantially transmitting pass light and substantially reflecting block light, wherein
for a range between 400 and 600 nm, an average transmission of block light is about 5% or less at normal incidence;
for a range between 600 and 680 nm, an average transmission of block light is 4% or greater at normal incidence;
for a range between 680 and 730 nm, an average transmission of block light is about 8% or greater at normal incidence;
for a range between 730 and 780 nm, an average transmission of block light is about 10% or greater at normal incidence; and
throughout all of a range between 400 and 680 nm, a transmission of pass light as measured at 60° angle of incidence is not less than 90%.

17. A reflective polarizer substantially transmitting pass light and substantially reflecting block light, wherein
the reflective polarizer is thinner than 30 μm;
an average transmission of block light at normal incidence between 420 and 750 nm is about 4.5 percent or greater but no higher than 12%; and
throughout all of a range between 400 and 680 nm, a transmission of pass light as measured at 60° angle of incidence is not less than 90%.

18. A reflective polarizer substantially transmitting pass light and substantially reflecting block light, wherein
for a range between 730 and 780 nm, an average transmission of block light at normal incidence is about 10% or greater but no greater than 30%; and
throughout all of a range between 400 and 680 nm, a transmission of pass light as measured at 60° angle of incidence is not less than 90%.

19. The reflective polarizer of claim 18, wherein for a range between 600 and 680 nm, an average transmission of block light at normal incidence is 4% or greater but no greater than 15%.

20. The reflective polarizer of claim 18, wherein for a range between 680 and 730 nm, an average transmission of block light at normal incidence is about 8% or greater but no greater than 25%.

21. A reflective polarizer substantially transmitting pass light and substantially reflecting block light, wherein
- an average transmission of block light at normal incidence between 600 and 750 nm is about 1.5 times or greater an average transmission of block light at normal incidence between 420 and 600 nm; and
- throughout all of a range between 400 and 680 nm, a transmission of pass light as measured at 60° angle of incidence is greater than or equal to a transmission of pass light as measured at normal incidence.

* * * * *